US012248422B2

(12) United States Patent
Ben-Chen et al.

(10) Patent No.: US 12,248,422 B2
(45) Date of Patent: Mar. 11, 2025

(54) SYSTEMS AND METHODS FOR LANE MANAGEMENT IN A COMMUNICATION BUS

(71) Applicant: QUALCOMM Incorporated, San Diego, CA (US)

(72) Inventors: Tomer Rafael Ben-Chen, Amikam (IL); Yaron Shachar, Raanana (IL); David Teb, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 18/314,359

(22) Filed: May 9, 2023

(65) Prior Publication Data
US 2024/0378164 A1    Nov. 14, 2024

(51) Int. Cl.
*G06F 13/40*  (2006.01)
*G06F 1/10*   (2006.01)

(52) U.S. Cl.
CPC ............ *G06F 13/4068* (2013.01); *G06F 1/10* (2013.01)

(58) Field of Classification Search
None
See application file for complete search history.

(56) References Cited

U.S. PATENT DOCUMENTS

| 11,425,697 | B2 * | 8/2022 | Tiirola | H04W 72/21 |
| 2020/0367234 | A1 * | 11/2020 | Bergstrom | H04L 5/0082 |
| 2023/0090873 | A1 | 3/2023 | Hyakudai et al. | |
| 2024/0014959 | A1 * | 1/2024 | Bhamri | H04W 72/0446 |

FOREIGN PATENT DOCUMENTS

WO    2017017562 A1    2/2017

OTHER PUBLICATIONS

International Search Report and Written Opinion for International Patent Application No. PCT/US2024/019411, mailed Jun. 12, 2024, 14 pages.
U.S. Appl. No. 17/821,935, filed Aug. 24, 2022.

* cited by examiner

*Primary Examiner* — Farley Abad
*Assistant Examiner* — Dayton Lewis-Taylor
(74) *Attorney, Agent, or Firm* — W&T/Qualcomm

(57) ABSTRACT

Systems and method for lane management in a communication bus are disclosed. In one aspects, a communication link or bus between a baseband processor (BBP) and a radio frequency integrated circuit (RFIC) may include multiple uplink lanes for transmission and multiple downlink lanes for reception that are frequency constrained and adjust bandwidth by adjusting duty cycles on the lanes. To reduce power consumption by the communication bus, exemplary aspects of the present disclosure contemplate using in-band signaling to turn off lanes selectively during inactive periods such that the lanes do not duty cycle in tandem with active lanes. Additionally, in some aspects, the uplink lanes may be continuously active during transmission while the downlink lanes are turned off. This dynamic lane usage reduces power consumption, does not require additional pins for sideband signaling, and does not introduce any additional latency.

20 Claims, 7 Drawing Sheets

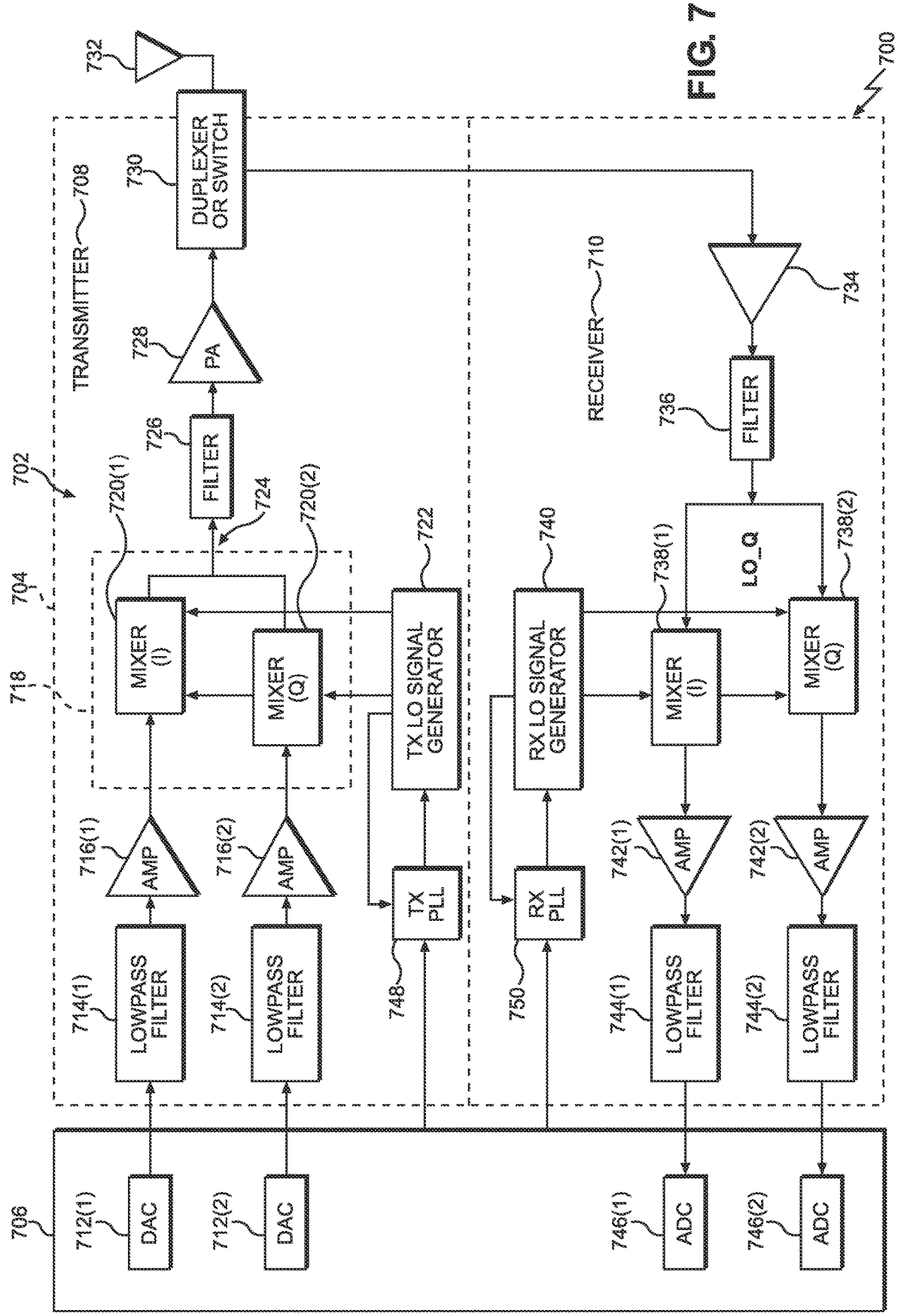

SYSTEMS AND METHODS FOR LANE MANAGEMENT IN A COMMUNICATION BUS

BACKGROUND

I. Field of the Disclosure

The technology of the disclosure relates generally to a communication bus and managing lanes therein to reduce power consumption.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to find ways to reduce power consumption. One way that power consumption has been reduced is to put circuits and communication links to sleep. However, optimizing when and how a communication link is put to sleep while at the same time preserving the ability of the link to convey signals without unwanted latency provides room for innovation.

SUMMARY

Aspects disclosed in the detailed description include systems and methods for lane management in a communication bus. In particular, a communication link or bus between a baseband processor (BBP) and a radio frequency integrated circuit (RFIC) may include multiple uplink lanes for transmission (e.g., from the BBP to the RFIC) and multiple downlink lanes for reception (e.g., from the RFIC to the BBP) that are frequency constrained and adjust bandwidth by adjusting duty cycles on the lanes. To reduce power consumption by the communication bus, exemplary aspects of the present disclosure contemplate using in-band signaling to turn off lanes selectively during inactive periods such that the lanes do not duty cycle in tandem with active lanes. Additionally, in some aspects, the uplink lanes may be continuously active during transmission while the downlink lanes are turned off. This dynamic lane usage reduces power consumption, does not require additional pins for sideband signaling, and does not introduce any additional latency.

In this regard, in one aspect, a baseband processor (BBP) is disclosed. The BBP includes a bus interface configured to couple to a communication bus, the bus interface comprising one or more uplink lanes and one or more downlink lanes. The BBP further includes a control circuit coupled to the bus interface and configured to adjust a bandwidth for the communication bus by changing a duty cycle associated with the communication bus. Further, while the communication bus is active, it cycles the one or more downlink lanes on and off during a receive slot and turns on at least one of the one or more uplink lanes on during an entirety of a transmit slot based on bandwidth needs.

In another aspect, a radio frequency integrated circuit (RFIC) is disclosed. The RFIC includes a bus interface configured to couple to a communication bus, the bus interface comprising a plurality of uplink lanes and a plurality of downlink lanes. The RFIC further includes a buffer and a control circuit coupled to the bus interface. The control circuit is configured to adjust a bandwidth for the communication bus by changing a duty cycle associated with the communication bus, and while the communication bus is inactive, buffer data from an antenna in the buffer and while the communication bus is active, it cycles the one or more downlink lanes on and off during a receive slot and turns on at least one of the one or more uplink lanes on during an entirety of a transmit slot based on bandwidth needs.

In another aspect, a method of controlling a communication bus is disclosed. The method includes adjusting a receive bandwidth for the communication bus by adjusting a receive duty cycle and, while in a receive slot, turning off at least one uplink lane and, while in a transmit slot, leaving all uplink lanes on for a duration of the transmit slot.

BRIEF DESCRIPTION OF THE DRAWINGS

FIG. 7 is a block diagram of an exemplary wireless communication device that includes radio-frequency (RF) components that can include the system of FIG. 1 and use the lane management techniques of the present disclosure.

DETAILED DESCRIPTION

Figure 1:
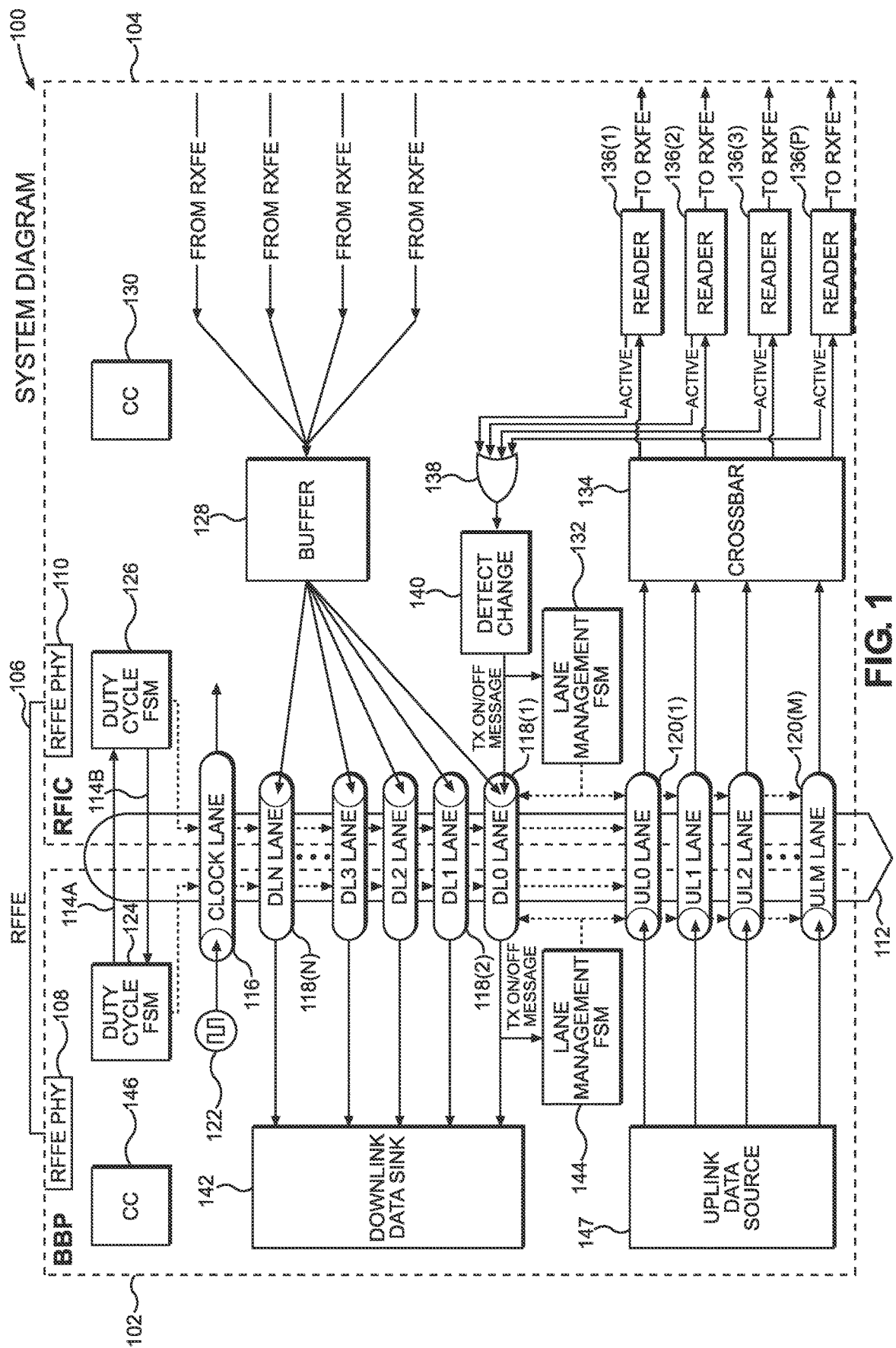
FIG. 1 is a block diagram of an exemplary system formed from a baseband processor (BBP) and a radio frequency integrated circuit (RFIC) having a first communication bus therebetween amenable to modification by aspects of the present disclosure and a radio frequency front end (RFFE) bus therebetween for RFFE control signals.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for lane management in a communication bus. In particular, a communication link or bus between a baseband processor (BBP) and a radio frequency integrated circuit (RFIC) may include multiple uplink lanes for transmission (e.g., from the BBP to the RFIC) and multiple downlink lanes for reception (e.g., from the RFIC to the BBP) that are frequency constrained and adjust bandwidth by adjusting duty cycles on the lanes. To reduce power consumption by the communication bus, exemplary aspects of the present disclosure contemplate using in-band signaling to turn off lanes selectively during inactive periods such that the lanes do not duty cycle in tandem with active lanes. Additionally, in some aspects, the uplink lanes may be continuously active during transmission while the downlink lanes are turned off. This dynamic lane usage reduces power consumption, does not require additional pins for sideband signaling, and does not introduce any additional latency.

In this regard, FIG. 1 is a block diagram of a system 100 that includes a BBP 102 and an RFIC 104. The BBP 102 is coupled to the RFIC 104 by a first communication bus 106, which conveys command and control data according to MIPI's Radio Frequency Front End (RFFE) protocol (or similar protocol). Relevantly, the signals on the first communication bus 106 do not contain data to be transmitted or data received. In an exemplary aspect, the BBP 102 may include an RFFE bus interface (e.g., a physical layer or PHY) 108, and the RFIC 104 may include a similar RFFE bus interface 110.

Additionally, the BBP 102 may be coupled to the RFIC 104 by a second communication bus 112. The second communication bus 112 may include sideband lanes 114A, 114B, a clock lane 116, a plurality of downlink lanes 118(1)-118(N) (also referred to in the drawings as DL0-DLN), and a plurality of uplink lanes 120(1)-120(M) (also referred to in the drawings as UL0-ULM).

The BBP 102 may include a clock source 122 that couples to the clock lane 116 and provides a clock signal to the RFIC 104. The shared clock signal allows relatively fast changes since there is no requirement that the clock at the RFIC 104 settle.

The BBP 102 may also include a duty cycle finite state machine 124 that communicates with an RFIC finite state machine 126 in the RFIC 104 over the sideband lanes 114A, 114B. The finite state machines 124, 126 may control duty cycles for the clock lane 116, the downlink lanes 118(1)-118(N), and the uplink lanes 120(1)-120(M). Data received (e.g., through an antenna and receive front end (RxFE) (neither shown) may be provided to a buffer 128 and held there for distribution to the downlink lanes 118(1)-118(N). An RFIC control circuit 130 may be present and control how and when the buffer 128 is drained into the downlink lanes 118(1)-118(N). In place of the RFIC control circuit 130, or in addition thereto, a lane management finite state machine 132 may also be involved in the management and use of the lanes 118(1)-118(N), 120(1)-120(M).

In addition to downlink signals from the antenna to the BBP 102, the RFIC 104 may receive signals through the uplink lanes 120(1)-120(M). A crossbar 134 may mix and/or route these incoming uplink signals to designated readers 136(1)-136(P). The readers 136(1)-136(P) provide uplink signals to a transmit front end (TxFE) for transmission through the antenna (neither shown). The readers 136(1)-136(P) may also provide signals to a logical OR gate 138, which provides an output to a detect change circuit 140. The detect change circuit 140 may provide information about detected changes to the lane management finite state machine 132 and/or the control circuit 130. Note further that information from the detect change circuit 140 may be sent over a downlink lane such as downlink lane 118(1) (DL0) to the BBP 102.

While not explicitly shown in FIG. 1, it should be appreciated that the RFIC 104 has a bus interface for the lanes 114A, 114B, 116, 118(1)-118(N), and 120(1)-120(M). This bus interface may include appropriate contact elements (e.g., pins, pads, balls, or the like) and circuit elements that allow the transmission of signals and reception of signals as is well understood.

The BBP 102 has many complementary elements that effectively interact with elements of the RFIC 104. Thus, the BBP 102 may have a downlink data sink circuit 142 that receives the signals from the downlink data lanes 118(1)-118(N) and work with a lane management finite state machine 144 and/or a BBP control circuit 146 to adjust lane usage based on traffic. Likewise, an uplink data source circuit 147 may provide signals to uplink lanes 120(1)-120(M) for transmission to the RFIC 104.

Again, while not explicitly shown in FIG. 1, it should be appreciated that the BBP 102 has a bus interface for the lanes 114A, 114B, 116, 118(1)-118(N), and 120(1)-120(M). This bus interface may include appropriate contact elements (e.g., pins, pads, balls, or the like) and circuit elements that allow the transmission of signals and reception of signals as is well understood.

In some aspects of the present disclosure, the communication bus 112 may be a QLINK bus, such as that disclosed in QUALCOMM's U.S. Pat. No. 9,602,433, which is hereby incorporated by reference in its entirety. It should also be appreciated that the present disclosure is applicable to other types of communication buses.

Figure 2:
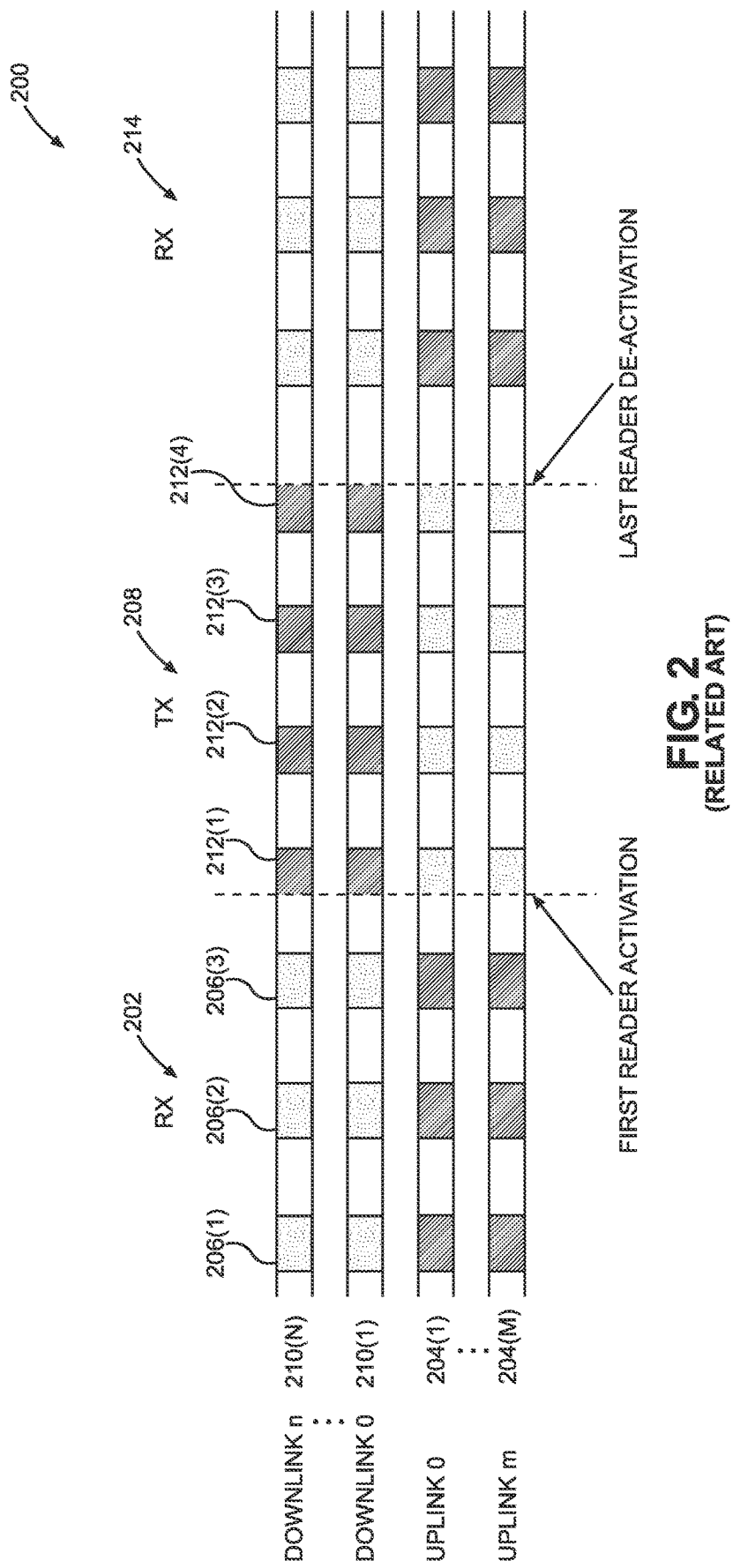
FIG. 2 is a signal diagram showing how the first communication bus is used in the absence of the present disclosure.

The QLINK bus uses time division duplexing (TDD) and is frequency constrained with a fixed operating frequency. Accordingly, bandwidth may be adjusted by changing a duty cycle of the lanes in the communication bus. Historically, all the lanes are cycled concurrently. This cycling occurs regardless of the actual traffic requirements. Thus, as illustrated in FIG. 2, a historical lane activity pattern 200 is seen where during a first receive slot 202, the uplink lanes 204(1)-204(M) are turned on in burst window slots 206(1)-206(3) even though there is no substantive traffic on the uplink lanes 204(1)-204(M). In this context, idle signals may be sent on the uplink lanes 204(1)-204(M), but such signals are not considered substantive. Similarly, during a transmit slot 208, downlink lanes 210(1)-210(N) are turned on in burst window slots 212(1)-212(4) even though there is no substantive traffic on the downlink lanes 210(1)-210(N).

As an aside, most user equipment, such as cell phones, spend much more time receiving data than transmitting, which explains why the burst window slots 206(1)-206(3) are wider than burst window slots 212(1)-212(4). A consequence of this data traffic disparity is that power may be needlessly consumed by idle uplink lanes 204(1)-204(M) during receive slots 202 and 214 while the downlink lanes 210(1)-210(N) are receiving data. Similarly, idle downlink lanes 210(1)-210(N) consume power while the uplink lanes 204(1)-204(M) are active in the transmit slot 208. However, because user equipment spends comparatively little time transmitting, the unnecessary power consumption in the transmit slot 208 is generally less than the unnecessary power consumption in the receive slots 202, 214.

There may be many ways to reduce power consumption by the communication bus 112. A simple solution would be to add additional sideband lanes to provide additional information about lanes that could be shut down while not in use. However, such additional lanes would increase pin counts, consume additional real estate in the various chips and add complexity to routing the lanes between chips. As such, this approach is sub-optimal. Another approach might be to change the duty cycle to have more time spent in inactive non-burst windows. However, such an approach may increase latency, and accordingly, such an approach is sub-optimal.

Exemplary aspects of the present disclosure provide an in-band solution that does not negatively impact latency. More specifically, exemplary aspects of the present disclosure, for TDD scenarios, turn on only uplink lanes during transmission, thus saving the downlink lanes power, and turn on only downlink lanes in a duty-cycle approach, thereby saving the uplink lanes power during reception. Optionally, one lane of the inactive lane group may be kept active for in-band signaling. This approach is illustrated in FIG. 3.

Figure 3:
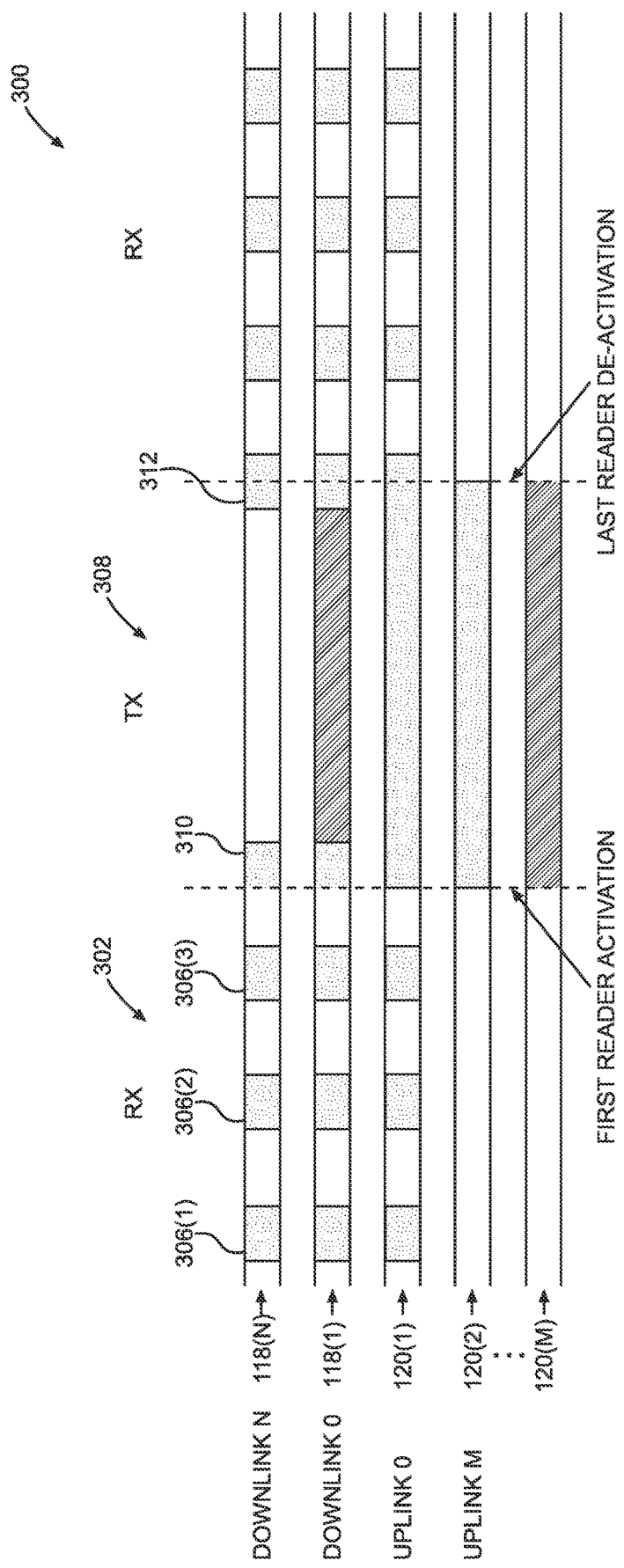
FIG. 3 is a signal diagram showing how lanes may be turned off according to aspects of the present disclosure for a time division duplex scenario.

In this regard, FIG. 3 illustrates a lane activity pattern 300, where during a first receive slot 302, the downlink lanes 118(1)-118(N) are active and transmitting information in burst windows 306(1)-306(3). Uplink lanes 120(2)-120(M) are inactive and not turned on during the burst windows 306(1)-306(3). Optionally (and as shown), the uplink lane 120(1) may be turned on at the same duty cycle as the downlink lanes 118(1)-118(N). Keeping the uplink lane 120(1) active in this fashion allows in-band signaling from the BBP 102 to the RFIC 104. Even turning off just one uplink lane of the plurality of uplink lanes 120(1)-120(M) would provide power savings, although the more lanes that can be kept off, the greater the power savings.

Similarly, during a transmit slot 308, downlink lanes 118(1)-118(N) may be turned off for substantially the entire slot 308. Instead of duty cycling the uplink lanes 120(1)-120(M), the lanes 120(1)-120(M) may be active during the entirety of the transmit slot 308. The downlink lanes 118(1)-118(N) may have a brief active burst 310 at the beginning of the slot 308 and another brief active burst 312 at the end of the slot 308. Optionally (and as shown), the downlink lane 118(1) may be continuously active for the duration of the slot 308. Again, this active downlink lane 118(1) may allow for in-band signaling from the RFIC 104 to the BBP 102 during the transmit slot 308. Note that the transmit slot 308 may be indicated by a first reader 136(1)-136(P) activation and ended by an indication of the last reader 136(1)-136(P) de-activation.

Figure 4:
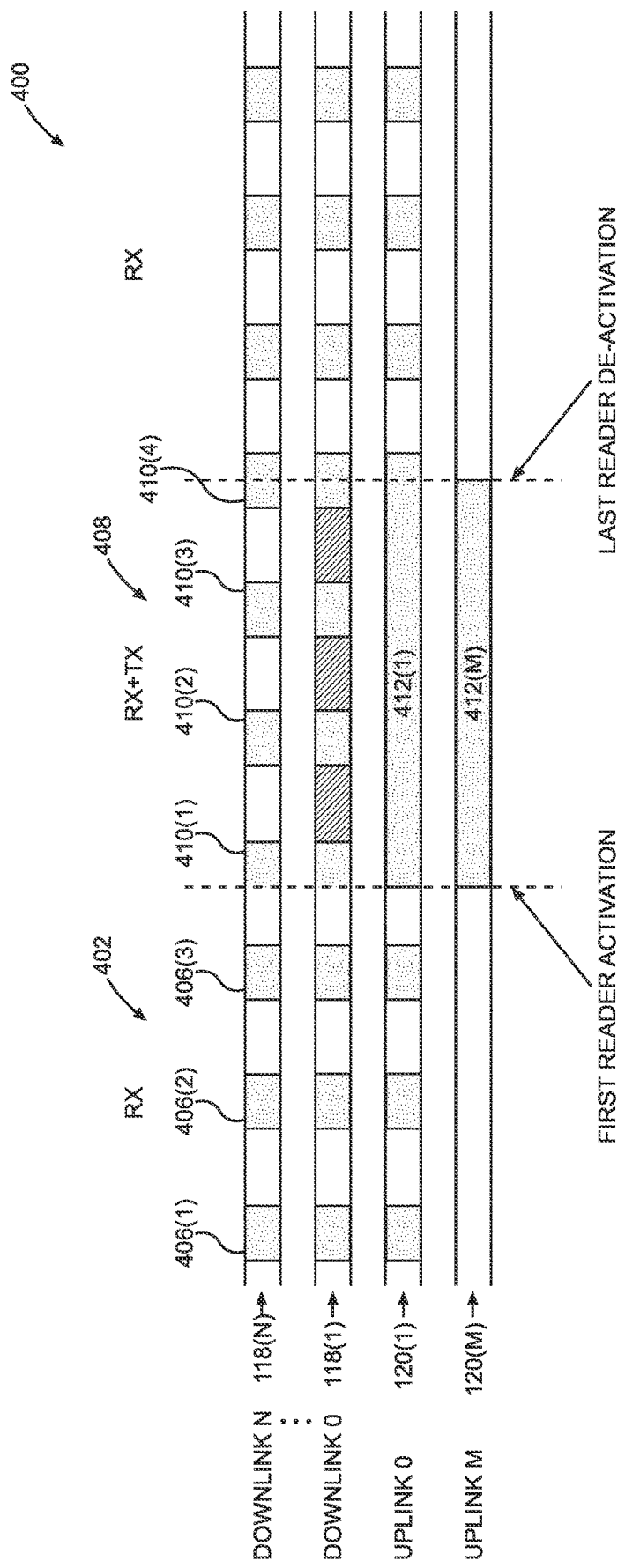
FIG. 4 is a signal diagram showing how lanes may be turned off according to aspects of the present disclosure for a frequency division duplex scenario.

The present disclosure is not limited to TDD scenarios and may be applied to a frequency division duplex scenario, as illustrated in FIG. 4. That is, FIG. 4 illustrates a lane activity pattern 400 where during a first receive slot 402, the downlink lanes 118(1)-118(N) are active and transmitting information in burst windows 406(1)-406(3). Uplink lanes 120(2)-120(M) are inactive and not turned on during the burst windows 406(1)-406(3). Optionally (and as shown), the uplink lane 120(1) may be turned on at the same duty cycle as the downlink lanes 118(1)-118(N). Keeping the uplink lane 120(1) active in this fashion allows in-band signaling from the BBP 102 to the RFIC 104. Even turning off just one uplink lane of the plurality of uplink lanes 120(1)-120(M) would provide power savings, although the more lanes that can be kept off, the greater the power savings.

A combined transmit and receive slot 408 may also be used where uplink lanes 120(1)-120(M) are kept active during windows 412(1)-412(M). In contrast, the downlink lanes 118(1)-118(N) may be duty cycled during bursts 410(1)-410(4). Optionally, and as shown, the downlink lane 118(1) may be kept active during the entire slot 408.

Figure 5:
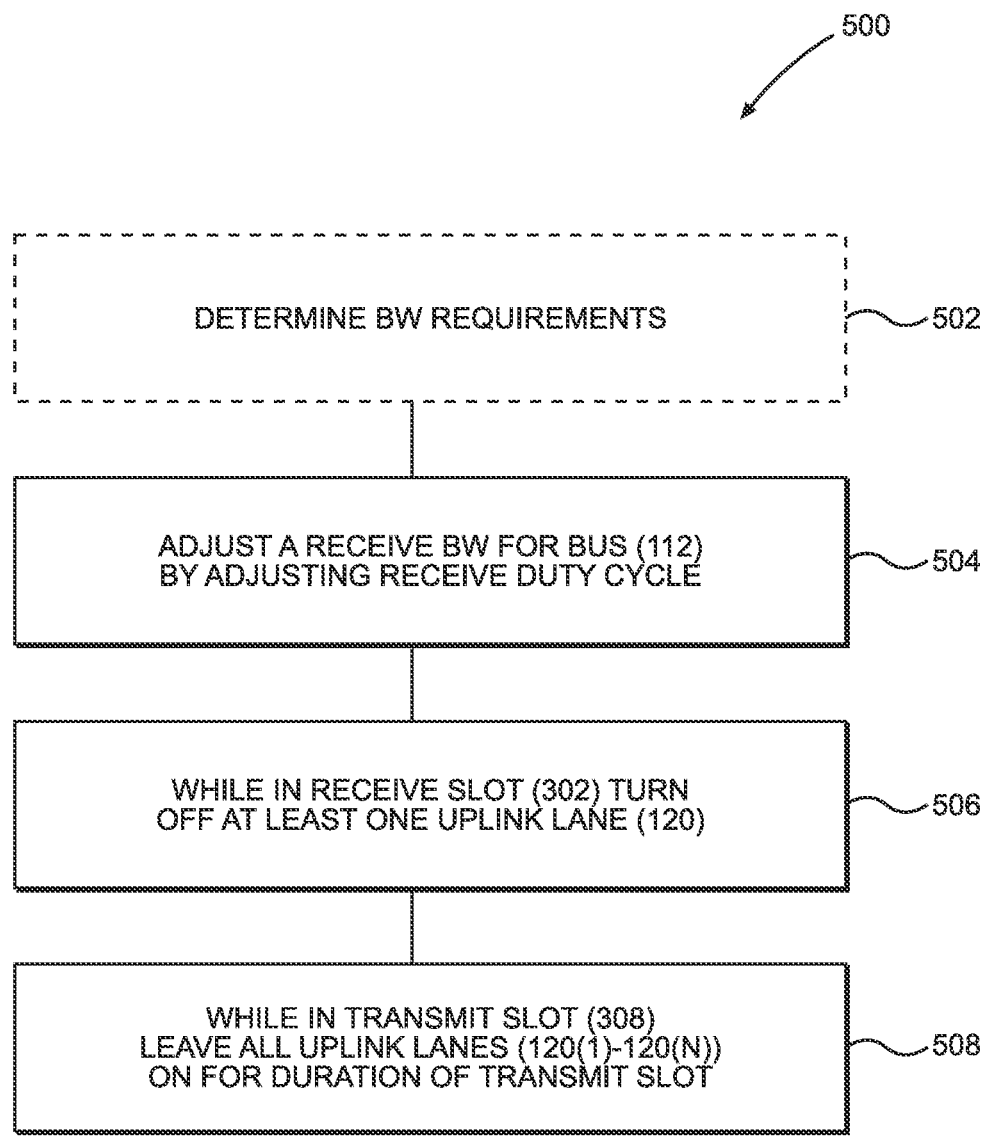
FIG. 5 is a flowchart illustrating an exemplary process for lane management in the system of FIG. 1 according to aspects of the present disclosure.

FIG. 5 provides a flowchart of a process 500 for managing the communication bus 112. Specifically, the process 500 may start by determining a bandwidth requirement (block 502). A control circuit such as control circuit 146 (or a finite state machine) may adjust a receive bandwidth for the communication bus 112 by adjusting a receive duty cycle (block 504).

While the communication bus 112 is in a receive slot 302, the control circuit may turn off at least one uplink lane 120 (block 506). Then, while in a transmit slot 308, the control circuit may leave all uplink lanes 120(1)-120(M) on for a duration of the transmit slot.

The systems and methods for lane management in a communication bus, according to aspects disclosed herein, may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
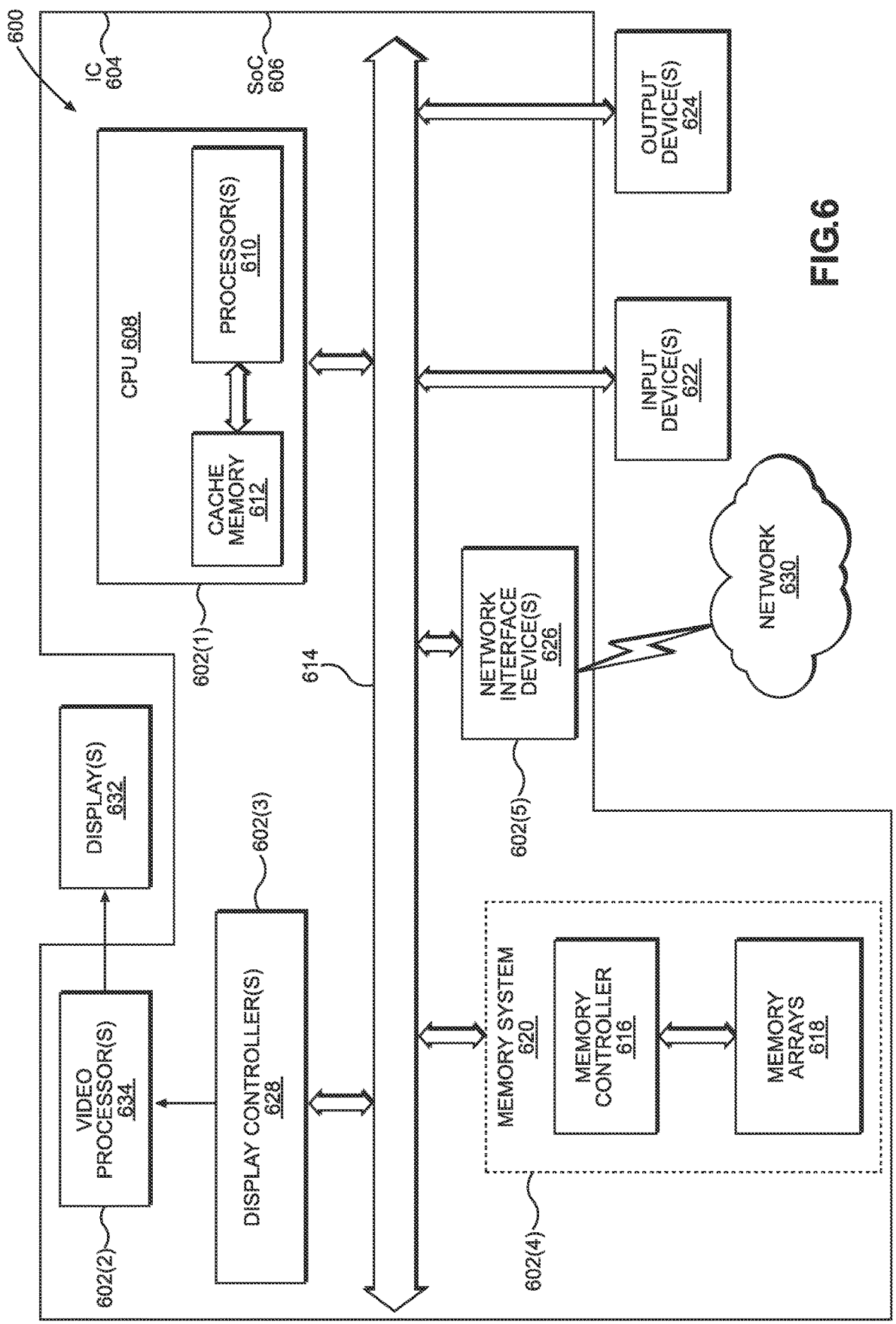
FIG. 6 is a block diagram of an exemplary processor-based system that can include the system of FIG. 1 and use the lane management techniques of the present disclosure.

In this regard, FIG. 6 illustrates an example of a processor-based system 600 that can include a communication bus 112 connecting a BBP 102 to an RFIC 104 according to any exemplary aspects disclosed herein. In this example, the processor-based system 600 may be formed as an IC 604 in an electronic device 602(1)-602(5) and as a system-on-a-chip (SoC) 606. The processor-based system 600 includes a central processing unit (CPU) 608 that includes one or more processors 610, which may also be referred to as CPU cores or processor cores. The CPU 608 may have cache memory 612 coupled to the CPU 608 for rapid access to temporarily stored data. The CPU 608 is coupled to a system bus 614 and can intercouple master and slave devices included in the processor-based system 600. As is well known, the CPU 608 communicates with these other devices by exchanging address, control, and data information over the system bus 614. For example, the CPU 608 can communicate bus transaction requests to a memory controller 616 as an example of a slave device.

As illustrated in FIG. 6, these devices can include a memory system 620 that includes the memory controller 616 and a memory array(s) 618, one or more input devices 622, one or more output devices 624, one or more network interface devices 626, and one or more display controllers 628, as examples. Each of the memory system(s) 620, the one or more input devices 622, the one or more output devices 624, the one or more network interface devices 626, and the one or more display controllers 628 can be provided in the same or different electronic devices 602(2)-602(5). The input device(s) 622 can include any type of input device, including, but not limited to, input keys, switches, voice processors, etc. The output device(s) 624 can include any type of output device, including, but not limited to, audio, video, other visual indicators, etc. The network interface device(s) 626 can be any device configured to allow exchange of data to and from a network 630. The network 630 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 626 can be configured to support any type of communications protocol desired. While described generically in FIG.

6, one such network interface device 626 may include the BBP 102, RFIC 104, and communication bus 112 of the present disclosure.

The CPU 608 may also be configured to access the display controller(s) 628 over the system bus 614 to control information sent to one or more displays 632. The display controller(s) 628 sends information to the display(s) 632 to be displayed via one or more video processor(s) 634, which processes the information to be displayed into a format suitable for the display(s) 632. The display controller(s) 628 and video processor(s) 634 can be included as ICs in the same or different electronic devices 602(2), 602(3), and in the same or different electronic devices 602 containing the CPU 608, as an example. The display(s) 632 can include any type of display, including, but not limited to, a cathode ray tube (CRT), a liquid crystal display (LCD), a plasma display, a light emitting diode (LED) display, etc.

More relevantly, FIG. 7 illustrates an exemplary wireless communications device 700 that includes radio-frequency (RF) components such as the BBP 102 and RFIC 104 formed from one or more ICs 702. As shown in FIG. 7, the wireless communications device 700 includes a transceiver 704 and a data processor 706. The data processor 706 may include a memory to store data and program codes. The transceiver 704 includes a transmitter 708 and a receiver 710 that support bi-directional communications. In general, the wireless communications device 700 may include any number of transmitters 708 and/or receivers 710 for any number of communication systems and frequency bands. All or a portion of the transceiver 704 may be implemented on one or more analog ICs, BBP 102, RFICs 104, mixed-signal ICs, etc.

The transmitter 708 or the receiver 710 may be implemented with a super-heterodyne architecture or a direct-conversion architecture. In the super-heterodyne architecture, a signal is frequency-converted between RF and baseband in multiple stages, for example, from RF to an intermediate frequency (IF) in one stage and then from IF to baseband in another stage for the receiver 710. In the direct-conversion architecture, a signal is frequency-converted between RF and baseband in one stage. The super-heterodyne and direct-conversion architectures may use different circuit blocks and/or have different requirements. In the wireless communications device 700 in FIG. 7, the transmitter 708 and the receiver 710 are implemented with the direct-conversion architecture.

In the transmit path, the data processor 706 processes data to be transmitted and provides I and Q analog output signals to the transmitter 708. In the exemplary wireless communications device 700, the data processor 706 includes digital-to-analog converters (DACs) 712(1), 712(2) for converting digital signals generated by the data processor 706 into the I and Q analog output signals (e.g., I and Q output currents) for further processing.

Within the transmitter 708, lowpass filters 714(1), 714(2) filter the I and Q analog output signals, respectively, to remove undesired signals caused by the prior digital-to-analog conversion. Amplifiers (AMPs) 716(1), 716(2) amplify the signals from the lowpass filters 714(1), 714(2), respectively, and provide I and Q baseband signals. An upconverter 718 upconverts the I and Q baseband signals with I and Q transmit (TX) local oscillator (LO) signals through mixers 720(1), 720(2) from a TX LO signal generator 722 to provide an upconverted signal 724. A filter 726 filters the upconverted signal 724 to remove undesired signals caused by the frequency up-conversion as well as noise in a receive frequency band. A power amplifier (PA) 728 amplifies the upconverted signal 724 from the filter 726 to obtain the desired output power level and provides a transmit RF signal. The transmit RF signal is routed through a duplexer or switch 730 and transmitted via an antenna 732.

In the receive path, the antenna 732 receives signals transmitted by base stations and provides a received RF signal, which is routed through the duplexer or switch 730 and provided to a low noise amplifier (LNA) 734. The duplexer or switch 730 is designed to operate with a specific receive (RX)-to-TX duplexer frequency separation, such that RX signals are isolated from TX signals. The received RF signal is amplified by the LNA 734 and filtered by a filter 736 to obtain a desired RF input signal. Down-conversion mixers 738(1), 738(2) mix the output of the filter 736 with I and Q RX LO signals (i.e., LO_I and LO_Q) from an RX LO signal generator 740 to generate I and Q baseband signals. The I and Q baseband signals are amplified by AMPs 742(1), 742(2) and further filtered by lowpass filters 744(1), 744(2) to obtain I and Q analog input signals, which are provided to the data processor 706. In this example, the data processor 706 includes analog-to-digital converters (ADCs) 746(1), 746(2) for converting the analog input signals into digital signals to be further processed by the data processor 706.

In the wireless communications device 700 of FIG. 7, the TX LO signal generator 722 generates the I and Q TX LO signals used for frequency up-conversion, while the RX LO signal generator 740 generates the I and Q RX LO signals used for frequency down-conversion. Each LO signal is a periodic signal with a particular fundamental frequency. A TX phase-locked loop (PLL) circuit 748 receives timing information from the data processor 706 and generates a control signal used to adjust the frequency and/or phase of the TX LO signals from the TX LO signal generator 722. Similarly, an RX PLL circuit 750 receives timing information from the data processor 706 and generates a control signal used to adjust the frequency and/or phase of the RX LO signals from the RX LO signal generator 740.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. As examples, the devices and components described herein may be employed in any circuit, hardware component, integrated circuit (IC), or IC chip. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Implementation examples are described in the following numbered clauses:

1. A baseband processor (BBP) comprising:
    a bus interface configured to couple to a communication bus, the bus interface comprising:
        one or more uplink lanes; and
        one or more downlink lanes; and
    a control circuit coupled to the bus interface and configured to:
        adjust a bandwidth for the communication bus by changing a duty cycle associated with the communication bus; and
        while the communication bus is active:
            cycle the one or more downlink lanes on and off during a receive slot; and
            turn on at least one of the one or more uplink lanes on during an entirety of a transmit slot based on bandwidth needs.
2. The BBP of clause 1, wherein the control circuit is further configured to turn off at least one of the one or more uplink lanes during the receive slot.
3. The BBP of clause 1 or 2, wherein the control circuit is configured to send data to a radio frequency integrated circuit (RFIC) over the communication bus.
4. The BBP of clause 3, wherein the control circuit is configured to send control signals to the RFIC over a radio frequency front end (RFFE) bus distinct from the communication bus.
5. The BBP of any of clauses 1-4, wherein a duty cycle for a receive slot is greater than a second duty cycle for the transmit slot.
6. The BBP of any of clauses 1-5, wherein the receive slot is time division duplexed (TDD).
7. The BBP of any of clauses 1-5, wherein the receive slot is frequency division duplexed (FDD).
8. The BBP of any of clauses 1-7, wherein the control circuit is further configured to cycle at least one of the uplink lanes on and off during the receive slot concurrently.
9. The BBP of clause 8, wherein the control circuit is further configured to send in-band signals on the at least one uplink lane during the receive slot.
10. The BBP of any of clauses 1-9, wherein the control circuit is further configured to leave at least one downlink on during the transmit slot.
11. The BBP of clause 10, wherein the control circuit is further configured to send in-band signals on the at least one downlink lane during the transmit slot.
12. A radio frequency integrated circuit (RFIC) comprising:
    a bus interface configured to couple to a communication bus, the bus interface comprising:
        a plurality of uplink lanes; and
        a plurality of downlink lanes;
    a buffer; and
    a control circuit coupled to the bus interface and configured to:
        adjust a bandwidth for the communication bus by changing a duty cycle associated with the communication bus;
        while the communication bus is inactive, buffer data from an antenna in the buffer; and
        while the communication bus is active:
            cycle the one or more downlink lanes on and off during a receive slot; and
            turn on at least one of the one or more uplink lanes on during an entirety of a transmit slot based on bandwidth needs.
13. The RFIC of clause 12, further comprising a plurality of readers associated with the uplink lanes; and
    wherein the control circuit is further configured to send a change notice on a downlink lane response to a signal from the plurality of readers.
14. The RFIC of clause 12 or 13, wherein the buffer is coupled to each of the plurality of downlink lanes.
15. The RFIC of any of clauses 12-14, wherein the bus interface further comprises a clock lane configured to receive a clock signal from a baseband processor.
16. A method of controlling a communication bus, the method comprising:

adjusting a receive bandwidth for the communication bus by adjusting a receive duty cycle;

while in a receive slot, turning off at least one uplink lane; and while in a transmit slot, leaving all uplink lanes on for a duration of the transmit slot.

17. The method of clause 16, further comprising, while in the receive slot, providing in-band commands on a downlink lane.

18. The method of clause 16 or 17, further comprising, while in the transmit slot, providing in-band commands on an uplink lane.

19. The method of any of clauses 16-18, further comprising using time division duplexing for signals on the communication bus.

20. The method of any of clauses 16-18, further comprising using frequency division duplexing for signals on the communication bus.

What is claimed is:

1. A baseband processor (BBP) comprising:
a bus interface configured to couple to a communication bus, the bus interface comprising:
one or more uplink lanes; and
one or more downlink lanes; and
a control circuit coupled to the bus interface and configured to:
adjust a bandwidth for the communication bus by changing a duty cycle associated with the communication bus; and
while the communication bus is active:
cycle the one or more downlink lanes on and off during a receive slot; and
turn on at least one of the one or more uplink lanes on during an entirety of a transmit slot.

2. The BBP of claim 1, wherein the control circuit is further configured to turn off at least one of the one or more uplink lanes during the receive slot.

3. The BBP of claim 1, wherein the control circuit is configured to send data to a radio frequency integrated circuit (RFIC) over the communication bus.

4. The BBP of claim 3, wherein the control circuit is configured to send control signals to the RFIC over a radio frequency front end (RFFE) bus distinct from the communication bus.

5. The BBP of claim 1, wherein a duty cycle for a receive slot is greater than a second duty cycle for the transmit slot.

6. The BBP of claim 1, wherein the receive slot is time division duplexed (TDD).

7. The BBP of claim 1, wherein the receive slot is frequency division duplexed (FDD).

8. The BBP of claim 1, wherein the control circuit is further configured to cycle at least one of the uplink lanes on and off during the receive slot concurrently.

9. The BBP of claim 8, wherein the control circuit is further configured to send in-band signals on the at least one uplink lane during the receive slot.

10. The BBP of claim 1, wherein the control circuit is further configured to leave at least one downlink on during the transmit slot.

11. The BBP of claim 10, wherein the control circuit is further configured to send in-band signals on the at least one downlink lane during the transmit slot.

12. A radio frequency integrated circuit (RFIC) comprising:
a bus interface configured to couple to a communication bus, the bus interface comprising:
a plurality of uplink lanes; and
a plurality of downlink lanes;
a buffer; and
a control circuit coupled to the bus interface and configured to:
adjust a bandwidth for the communication bus by changing a duty cycle associated with the communication bus;
while the communication bus is inactive, buffer data from an antenna in the buffer; and
while the communication bus is active:
cycle the one or more downlink lanes on and off during a receive slot; and
turn on at least one of the one or more uplink lanes on during an entirety of a transmit slot.

13. The RFIC of claim 12, further comprising a plurality of readers associated with the uplink lanes; and
wherein the control circuit is further configured to send a change notice on a downlink lane response to a signal from the plurality of readers.

14. The RFIC of claim 12, wherein the buffer is coupled to each of the plurality of downlink lanes.

15. The RFIC of claim 12, wherein the bus interface further comprises a clock lane configured to receive a clock signal from a baseband processor.

16. A method of controlling a communication bus, the method comprising:
adjusting a receive bandwidth for the communication bus by adjusting a receive duty cycle;
while in a receive slot, turning off at least one uplink lane being conveyed on the communication bus; and
while in a transmit slot, leaving all uplink lanes on for a duration of the transmit slot, wherein all uplink lanes are conveyed on the communication bus.

17. The method of claim 16, further comprising, while in the receive slot, providing in-band commands on a downlink lane.

18. The method of claim 16, further comprising, while in the transmit slot, providing in-band commands on an uplink lane.

19. The method of claim 16, further comprising using time division duplexing for signals on the communication bus.

20. The method of claim 16, further comprising using frequency division duplexing for signals on the communication bus.

* * * * *